(12) United States Patent
Yoon (10) Patent No.: US 7,570,838 B2
(45) Date of Patent: Aug. 4, 2009

(54) IMAGE CORRECTION METHOD FOR COMPENSATING FOR MISALIGNMENT OF PIXELS IN HOLOGRAPHIC DIGITAL DATA STORAGE SYSTEM

(75) Inventor: Pil Sang Yoon, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 952 days.

(21) Appl. No.: 11/024,825

(22) Filed: Dec. 30, 2004

(65) Prior Publication Data

US 2005/0286095 A1   Dec. 29, 2005

(30) Foreign Application Priority Data

Jun. 24, 2004   (KR)   .................. 10-2004-0047470

(51) Int. Cl.
```
G06K 9/40     (2006.01)
H04N 1/38     (2006.01)
H04N 5/228    (2006.01)
H04N 5/217    (2006.01)
H04N 9/64     (2006.01)
```
(52) U.S. Cl. .................. 382/275; 348/208.13; 348/241; 348/245; 348/246; 358/463
(58) Field of Classification Search ................ 358/3.26, 358/530, 463; 382/267, 268, 269, 275; 348/208.13, 348/241, 245, 246
See application file for complete search history.

(56) References Cited

U.S. PATENT DOCUMENTS

| | | | |
|---|---|---|---|
| 5,511,058 A | 4/1996 | Visel et al. | |
| 6,697,316 B2 | 2/2004 | Burr | 369/103 |
| 6,897,956 B2 * | 5/2005 | Noguchi et al. | 356/401 |
| 2002/0145717 A1 * | 10/2002 | Baselmans et al. | 355/55 |
| 2002/0172131 A1 | 11/2002 | Burr | |
| 2003/0027159 A1 * | 2/2003 | Ward et al. | 435/6 |
| 2003/0160960 A1 * | 8/2003 | Noguchi et al. | 356/401 |
| 2003/0164951 A1 * | 9/2003 | Deck | 356/519 |
| 2005/0036149 A1 * | 2/2005 | Hill | 356/450 |

FOREIGN PATENT DOCUMENTS

EP   1610309   * 12/2008

* cited by examiner

*Primary Examiner*—Jerome Grant, II
(74) *Attorney, Agent, or Firm*—Bacon & Thomas, PLLC (57) ABSTRACT

For compensating for misalignment of pixels at the time of reproduction in a Holographic Digital Data Storage (HDDS) system, and thereby correcting an image, a stored page-based image is detected using a Charge Coupled Device (CCD) through a one-to-one (1:1) pixel matching between data pixels and CCD detector pixels at the time of reproduction. And then, in case the misalignment of pixels occurs during the 1:1 pixel matching, an amount of the misalignment d ($0 \leq d < 1$) between a corresponding data pixel and a corresponding CCD detector pixel is calculated. Further, an interference influence of a neighboring pixel on the corresponding CCD detector pixel is calculated based on the calculated amount of the misalignment, to thereby correct image data of the CCD detector pixel. And last, a misalignment influence in accordance with the amount of the misalignment is compensated for, to thereby correct the image data of the CCD detector pixel.

5 Claims, 7 Drawing Sheets

IMAGE CORRECTION METHOD FOR COMPENSATING FOR MISALIGNMENT OF PIXELS IN HOLOGRAPHIC DIGITAL DATA STORAGE SYSTEM

FIELD OF THE INVENTION

The present invention relates to a holographic digital data storage system; and, more particularly, to an image correction method, which compensates for a misalignment of charge coupled device pixels when detecting a page-based information image, recorded on a holographic storage medium, using a charge coupled device through one-to-one pixel matching signal processing in a holographic digital data storage system.

BACKGROUND OF THE INVENTION

From the viewpoint of the data recording/reproduction principle, a Holographic Digital Data Storage (HDDS) system is typically a page-oriented memory using a volumetric hologram principle. An HDDS system can implement a super high input/output speed of 1 Gbps or above by using a parallel data processing scheme as an input/output scheme, and can be constructed without a mechanical driving unit to thereby implement a very fast data access time of 100 μs or less. And accordingly, the HDDS system has attracted attention as an advanced memory device.

In the meantime, the HDDS system detects and decodes a page-based information image, recorded on a storage medium, using a CCD at the time of reproduction. In this case, in order to decode page-based image data, i.e., binary pixel data, reproduced from the storage medium into original data, one-to-one (1:1) matching signal processing is performed by a CCD, etc. That is, the pixels of the image reproduced from the storage medium and the pixels of the CCD array are matched with each other in a one-to-one manner, thus reproducing original pixel data.

However, a shift multiplexing system using the above-described 1:1 pixel matching is problematic in that there occurs serious degradation of data detected in a CCD array in case a misalignment between a data pixel and a CCD pixel reaches approximately ½ of the size of the CCD pixel.

In order to solve this problem, a conventional method of inversely calculating an ON or OFF level of a Spatial Light Modulator (SLM) by using the inverse transformation of an optical model on the basis of the optical model to thereby correct misaligned pixels has been proposed by Burr of IBM. In the method proposed by Burr, if a Point Spread Function (PSF) is assumed to be a sinc function, an optical field h(x) through the SLM (whose fill factor is $ff_s$) can be expressed in Equation 1 when the width of a Fourier transform aperture is D and the width of a Nyquist aperture is $D_N$.

$$h(x) = c \int_{-ff_d/2}^{ff_d/2} \text{sinc}\left(\frac{D}{D_N}(x-x')\right) dx' \quad \text{Equation 1}$$

Figure 1:
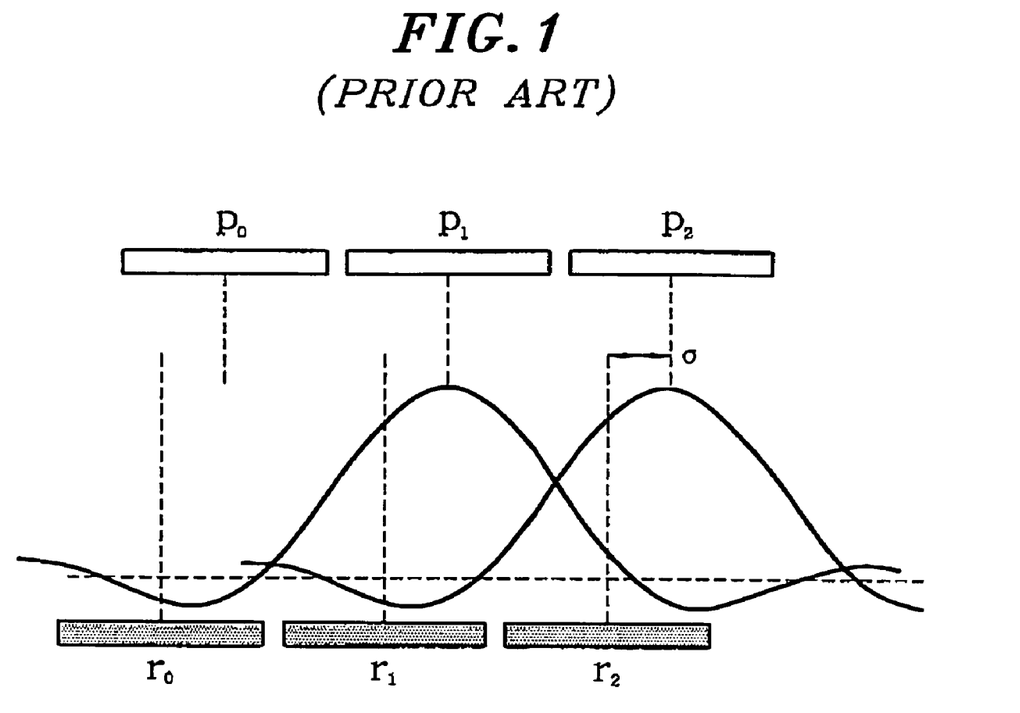
FIG. 1 illustrates a conceptual view showing image correction processing using optical modeling in a conventional HDDS system.

In this case, if it is assumed that the intensities of signals transmitted from the SLM are $p_0$, $p_1$, and $p_2$, as shown in FIG. 1, and the point spread function (PSF) does not spread a beam above a pixel pitch an optical field, for example, $r_2$ in FIG. 1, detected by a CCD detection unit, is influenced only by $p_1$ and $p_2$, and accordingly, $r_2$ can be given as expressed in Equation 2.

$$r_2 = \int_{ff_d/2}^{ff_d/2} [\sqrt{p_2}h(x-\sigma) + \sqrt{p_1}h(x-\sigma+1)]^2 dx \quad \text{Equation 2}$$

In this case, $ff_d$ is the fill factor of the detector, so that Equation 2 can be rearranged to be expressed by three terms as in the following Equation 3.

$$r_2 = p_2 H_{00}(\sigma) + 2\sqrt{p_1 p_2} H_{01}(\sigma) + p_1 H_{11}(\sigma) \quad \text{Equation 3}$$

wherein $H_{00}$, $H_{01}$ and $H_{11}$ are the values of the optical fields detected at the detector pixels. If the above optical model is used, $p_2$ can be obtained by the following Equation 4 on the assumption that $p_1$ has been obtained. That is, the ON or OFF levels of the SLM at the pixels $p_0$, $p_1$ and $p_2$, can be inversely calculated using the values of the optical fields detected by the detector. Therefore, even though misalignment of pixels occurs at the time of reproduction, an image detected by the detector can be corrected.

$$p_2 = \frac{1}{H_{00}(\sigma)} \Big[ -\left(\sqrt{p_1} H_{01}(\sigma)\right) + \sqrt{p_1((H_{01}(\sigma))^2 - (H_{00}(\sigma) H_{11}(\sigma))) + (H_{00}(\sigma) r_2)} \Big] \quad \text{Equation 4}$$

However, the above-described image correction method for the misalignment of pixels using the optical model of Burr is problematic in that it takes lots of time to calculate original signal intensities passing through the SLM with the values of the optical fields detected at the detector pixels, thus decreasing an image data processing speed.

In the meantime, as another method for solving the problem of serious degradation of the data detected in the CCD array when the 1:1 pixel matching is applied, there has been proposed an oversampling method of oversampling a single pixel of an image reproduced from a storage medium into nine pixels in a CCD array and reconstructing only the data of a single center pixel among the nine pixel data as original data. This method is advantageous in that it has a small amount of calculation compared to the optical modeling method of Burr and can restore data relatively precisely, but is problematic in that it must oversample original image data at the time of reproduction, thus increasing the size of a CCD array.

SUMMARY OF THE INVENTION

It is, therefore, an object of the present invention to provide an image correction method, which compensates for a misalignment of charge coupled device pixels when detecting a page-based information image, recorded on a holographic storage medium, by using a charge coupled device through one-to-one pixel matching signal processing in a holographic digital data storage system.

In accordance with the present invention, there is provided an image correction method for compensating for misalignment of pixels at the time of reproduction in a Holographic Digital Data Storage (HDDS) system, including the steps of: a) detecting a stored page-based image using a Charge Coupled Device (CCD) through a one-to-one (1:1) pixel matching between data pixels and CCD detector pixels at the time of reproduction; b) calculating, in case the misalignment of pixels occurs during the 1:1 pixel matching, an amount of the misalignment between a corresponding data pixel and a corresponding CCD detector pixel; c) calculating an interference influence of a neighboring pixel on the corresponding CCD detector pixel based on the calculated amount of the misalignment, and correcting image data of the CCD detector pixel; and d) compensating for a misalignment influence in accordance with the amount of the misalignment, and correcting the image data of the CCD detector pixel.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENTS

A preferred embodiment of the present invention will now be described in detail with reference to the accompanying drawings.

Figure 2:
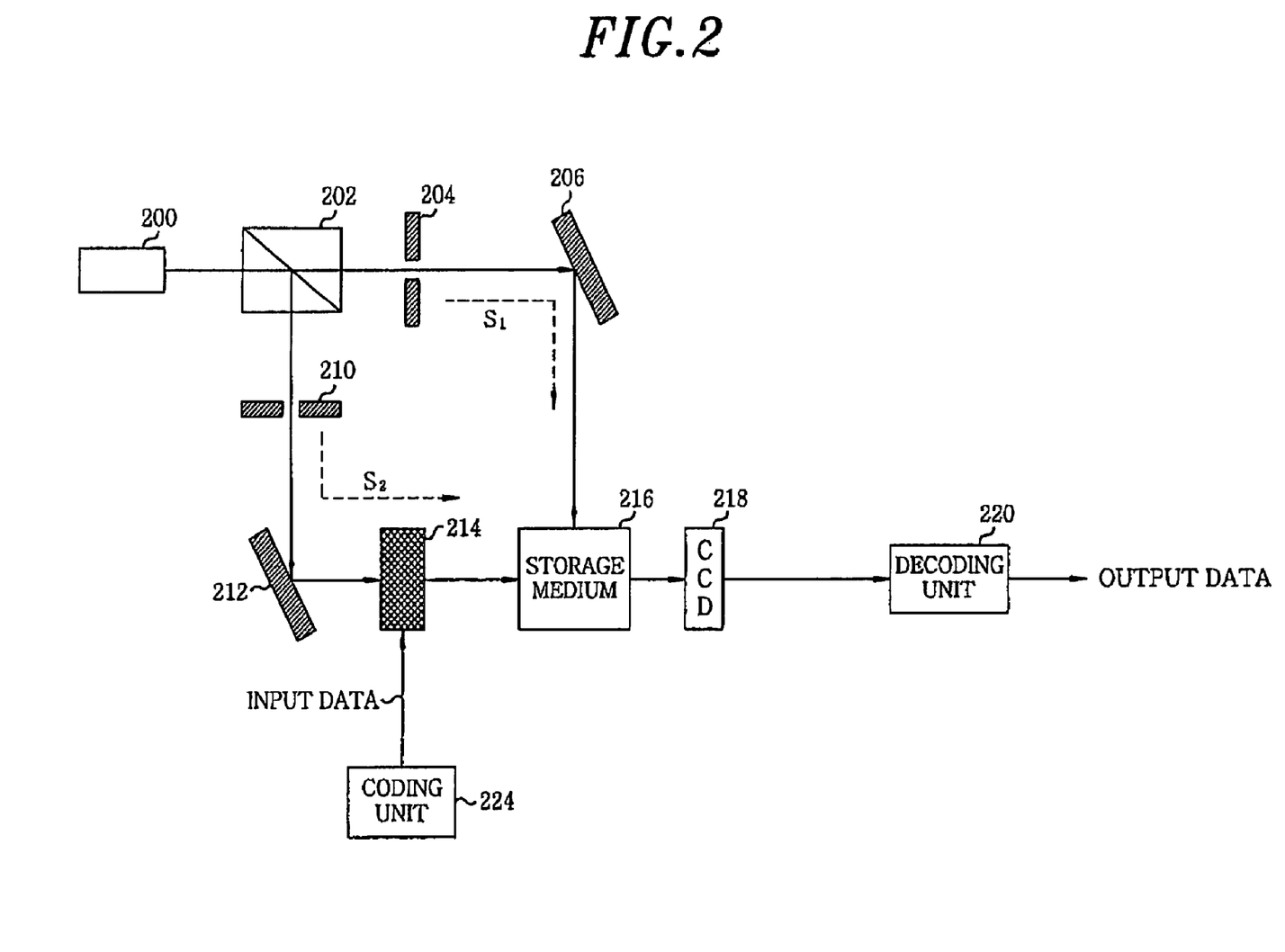
FIG. 2 illustrates a schematic block diagram of an HDDS system to which the preferred embodiment of the present invention is applied.

FIG. 2 illustrates a block diagram of an HDDS system to which the preferred embodiment of the present invention is applied. Hereinafter, with reference to FIG. 2, operations of recording/reproducing holographic data in the HDDS system are described.

First, a beam splitter 202 splits laser light incident from a light source 200 into a reference beam and an object beam. The reference beam, which is a vertically polarized beam, is provided along a reference beam processing path S1, and the object beam is provided along an object beam processing path S2. Further, in the reference beam processing path S1, a shutter 204 and a reflective mirror 206 are provided in a direction in which the reference beam proceeds. Through this optical transmission path, the reference beam processing path S1 reflects the reference beam required for the recording or reproduction of holographic data at a predetermined deflection angle and provides the reflected beam to a storage medium 216.

In other words, the vertically polarized reference beam that is split by the beam splitter 202 and incident through the aperture of the shutter 204 is adjusted by an optical lens (not shown), etc., and expanded to a certain size (that is, expanded to a size sufficient to cover the size of the object beam expanded by a beam expander [not shown] in the object beam processing path S2, which will be described later). The expanded beam is deflected at a predetermined angle, for example, a recording angle for recording, or a reproduction angle for reproduction, by the reflective mirror 206, and then incident on the storage medium 216. In this case, the reference beam used for recording or reproduction is controlled by rotating the reflective mirror 206 to thereby vary the deflection angle θ thereof whenever binary data in respective pages are recorded on the storage medium 216. Through the use of this reference beam deflection technique, hundreds to thousands of pages of holographic data may be recorded on the storage medium 216, or stored holographic data may be reproduced from the storage medium.

In the meantime, in the object beam processing path S2, a shutter 210, a reflective mirror 212 and a spatial light modulator 214 are sequentially provided in a direction in which the object beam proceeds. The shutter 210 maintains an open status in a recording mode, and maintains a closed status in a reproduction mode. The object beam that is split by the beam splitter 202 and incident through the aperture of the shutter 210 is reflected by the reflective mirror 212 at a certain deflection angle, and then transmitted to the spatial light modulator 214.

Then, the object beam transmitted from the reflective mirror 212 is modulated by the spatial light modulator 214 into a signal beam corresponding to page-based binary data expressed in the brightness of pixels in accordance with the input data provided from a data coding unit 224 (for example, the object beam incident on the spatial light modulator 214 is modulated into a frame-based signal beam when input data are image data of a frame of an image). Thereafter, the modulated signal beam is synchronized with the reference beam incident from the reflective mirror 206 in the reference beam processing path S1, and is then incident on the storage medium 216. Therefore, on the storage medium 216, in a recording mode, an interference pattern obtained due to the interference between the signal beam, modulated into page-based binary data and provided from the spatial light modulator 214, and the reference beam for recording, incident from the reflective mirror 206 at a deflection angle θ corresponding to the signal beam, is recorded. That is, depending on the intensity of the interference pattern obtained due to the interference between the modulated object beam and the reference beam, a phenomenon in which moving electric charges induce light occurs in the storage medium 216. Through this process, the interference pattern of three-dimensional holographic data is recorded on the storage medium 216.

Further, when holographic data recorded on the storage medium 216 are reproduced, the shutter 210 in the object beam processing path S2 is closed, and the shutter 204 in the reference beam processing path S1 is opened. Accordingly, the reference beam (reference beam for reproduction), split by the beam splitter 202, is reflected by the reflective mirror 206 and irradiated onto the storage medium 216. As a result, the interference pattern recorded on the storage medium 216 diffracts the incident reference beam for reproduction to demodulate it into page-based binary data expressed in the original brightness of the pixels. The demodulated reproduction output is irradiated onto a CCD 218. Accordingly, the CCD 218 restores the reproduction output irradiated from the storage medium 216 into original data, that is, electrical signals, which are reproduced and output through a data decoding unit 220.

In the meantime, the decoding unit 220 restores data by a 1:1 pixel matching in accordance with the preferred embodiment of the present invention, without performing oversampling at the time of reproduction. In this case, in order to compensate for the degradation of data due to the misalignment between data pixels and CCD pixels during the signal processing of the 1:1 pixel matching, the decoding unit 220 calculates the amount of misalignment of a misaligned data pixel, which is detected in a CCD array, and corrects a reproduced image with considering the intensity value measured at a corresponding CCD pixel and the interference of a neighboring pixel caused by the misalignment of pixels.

Hereinafter, the operation of the decoding unit 220 is described in detail. First, a single ON pixel detected in the CCD after passing through the Spatial Light Modulator (SLM), a Fourier transform aperture D and a Nyquist aperture $D_N$, is modeled by Equation 1 as in the optical model of Burr.

Figure 3:
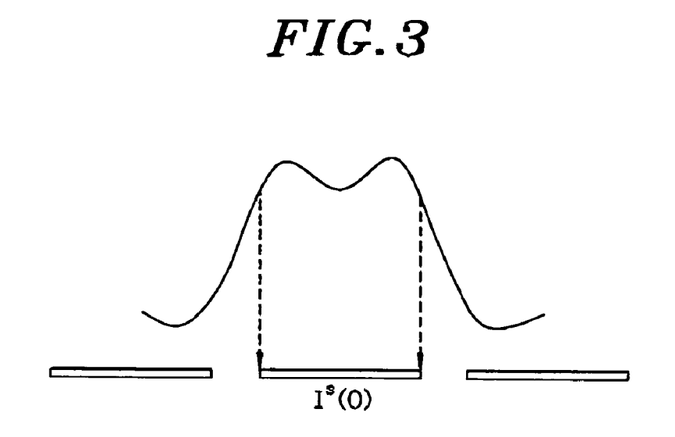
FIGS. 3 to 5 illustrate examples to show the misalignment between data pixels and CCD detector pixels in accordance with the preferred embodiment of the present invention.

That is, an optical field at a CCD detector pixel is represented as shown in FIG. 3 when a misalignment does not occur. In FIG. 3, $I^s(0)$ denotes a value obtained by integrating the optical field h(x) of Equation 1 at the CCD detector pixel for an exposure time. If a misalignment of δ occurs when the single ON pixel exists as above, the optical field moves and influences a neighboring CCD detector pixel of the ON pixel, as shown in FIG. 4.

Figure 4:
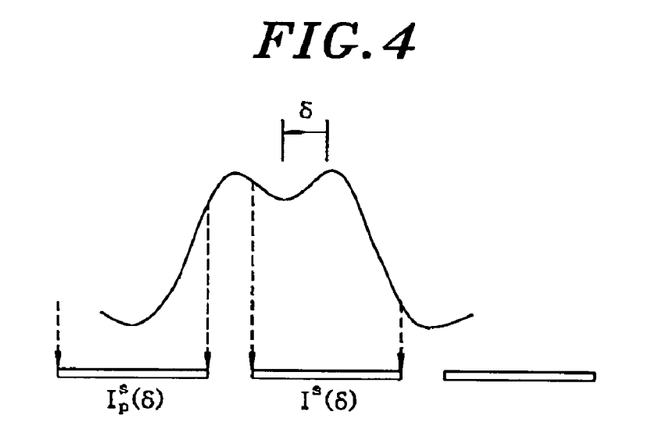

Therefore, as shown in FIG. 4, $I^s(δ)$ denotes the intensity detected at the corresponding CCD detector pixel when the misalignment of δ occurs, and $I^s_p(δ)$ denotes the intensity added to the neighboring CCD detector pixel due to a misalignment of δ. At this time, if another neighboring pixel is also an ON pixel, as shown in FIG. 5, since light used for a holographic storage device causes interference, the corresponding ON pixel is interfered with by the neighboring ON pixel.

Figure 5:
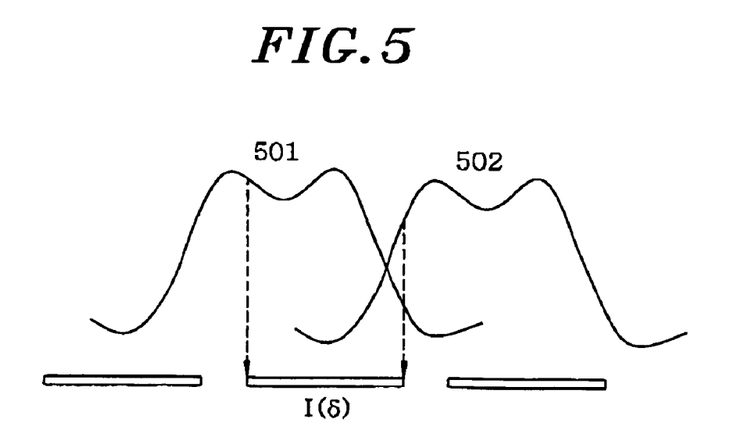

That is, I(δ) of FIG. 5 differs from a value simply obtained by $I^s_p(δ)+I^s(δ)$. The reason for this is that an optical field 501 and an optical field 502 interfere with each other due to the neighboring ON pixel. Therefore, if the interference influence caused by the optical field of the neighboring pixel is expressed in $I_{int}(δ)$, I(δ) can be expressed in the following Equation 5.

$$I(δ) = I^s(δ) + α[I^s_p(δ) + I_{int}(δ)], \quad \text{Equation 5}$$
$$\text{wherein } α = \begin{pmatrix} 0 & \text{if neighboring pixel is OFF} \\ 1 & \text{if neighboring pixel is ON} \end{pmatrix}$$

Therefore, if the influence of the neighboring pixel is eliminated from the optical field intensity currently detected by the decoding unit 220, a value, detected at the corresponding CCD detector pixel when a misalignment of δ occurs in case a single ON pixel exists, that is, $I^s(δ)$, can be obtained by the following Equation 6.

$$I^s(δ)=I(δ)-α[I^s_p(δ)+I_{int}(δ)] \quad \text{Equation 6}$$

Further, if the amount of misalignment δ can be known, the misalignment influence can be compensated for as in the following Equation 7, thus calculating $I^s(0)$, after all, from the value I(δ) detected at the CCD detector pixel. In this case, $I_{diff}(0,δ)$, which is a value representing the misalignment influence on the intensity, can be obtained by a simple experiment, and may be obtained in advance for amounts of misalignments to be constructed in a form of, for example, a lookup table, and referred to.

$$I^s(0)=I^s(δ)+I_{diff}(0,δ),$$
$$\text{wherein } I_{diff}(0,δ)=I^s(0)-I^s(δ) \quad \text{Equation 7}$$

Figure 6:
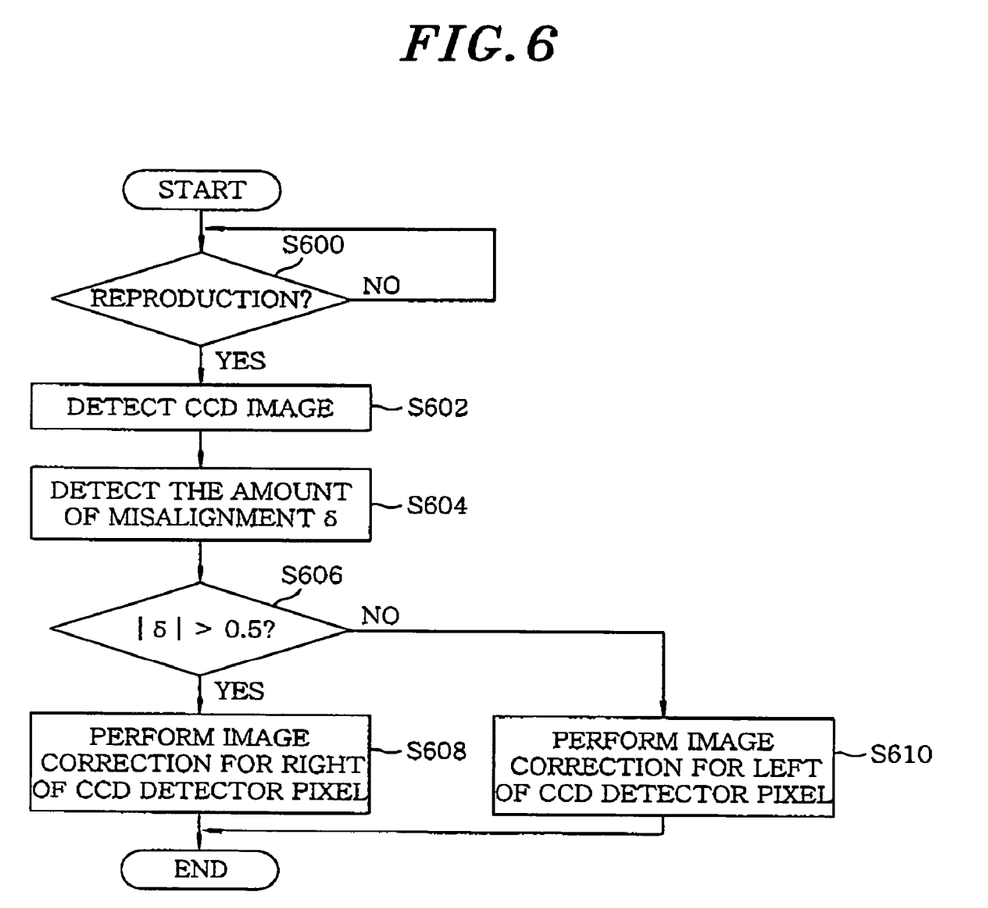
FIG. 6 illustrates a flowchart of a process of correcting an image with misaligned pixels in an HDDS system in accordance with the preferred embodiment of the present invention.

FIG. 6 illustrates a control flow of operations for correcting an image with misaligned pixels at the time of reproduction by the decoding unit 220 of the HDDS system. Hereinafter, the preferred embodiment of the present invention is described in detail with reference to FIG. 6.

That is, if there is a reproduction request for a holographic storage medium at step S600, the decoding unit 220 of the HDDS system proceeds to step S602 in response to the reproduction request, and detects a page-based information image recorded on the holographic storage medium using a CCD at step S602.

And, the decoding unit 220 detects the amount of misalignment δ (0≦δ<1) between a data pixel, reproduced from the holographic storage medium, and a CCD pixel when a misalignment occurs between the data pixel and the CCD pixel at step S604. The reason for this operation is to compensate for the misalignment influence on the basis of the value I(δ) detected at the CCD detector pixel and then calculate $I^s(0)$, as described above.

Then, the decoding unit 220 determines whether the amount of misalignment δ exceeds 0.5 pixel at step S606, thus determining the direction in which the intensity value of the misaligned image is to be corrected.

Figure 7A:
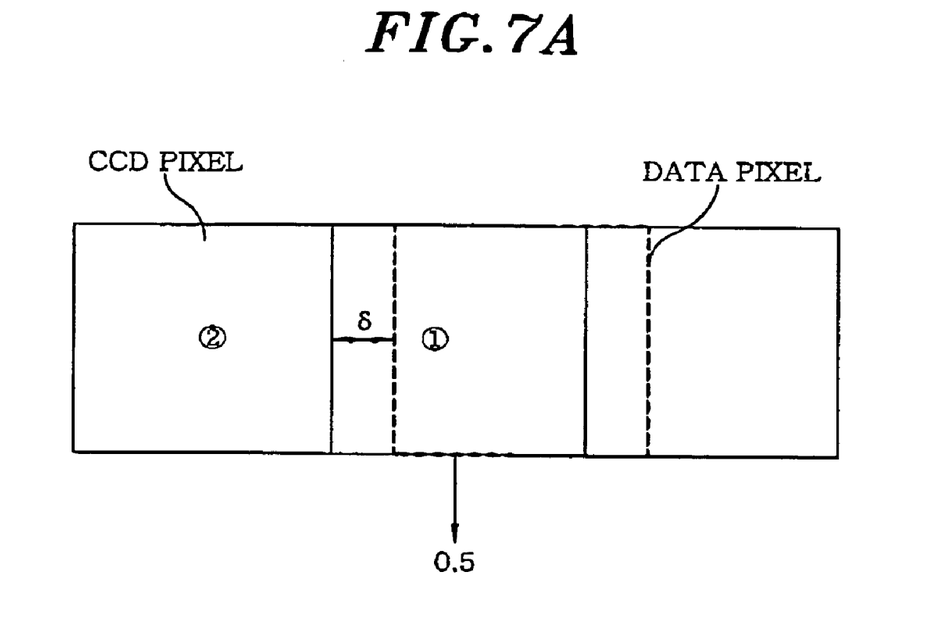
FIGS. 7a and 7b illustrate examples of the setting of an image correction direction based on the amount of misalignment δ between pixels in accordance with the preferred embodiment of the present invention.
Figure 7B:
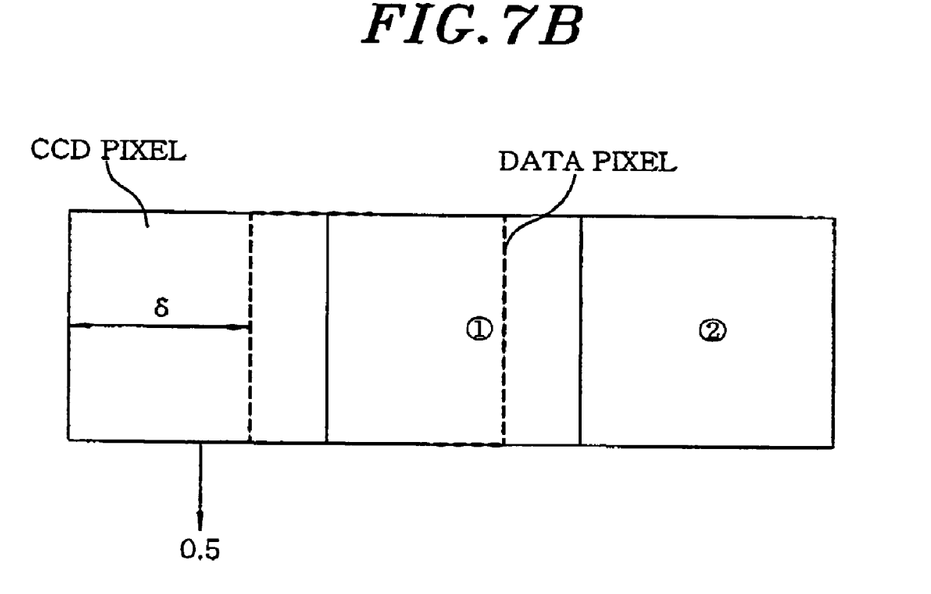

In this case, if the amount of misalignment δ between the CCD pixel and the data pixel exceeds 0.5 pixel, as shown in FIG. 7b, it is determined that the data pixel is misaligned to the left of the CCD pixel. At this time, if a CCD pixel ② is an ON pixel, a CCD pixel ① is influenced by the ON pixel ②, so that a neighboring pixel for determining α in Equation 5 of the image correction method of the present invention is the pixel ②. Therefore, the decoding unit 220 proceeds to step S608 from step S606, thus performing image correction for the right of the CCD detector pixel at step S608.

On the contrary, if the amount of misalignment δ between the CCD pixel and the data pixel does not exceed 0.5 pixel, as shown in FIG. 7a, it is determined that the data pixel is misaligned to the right of the CCD pixel. At this time, the misaligned CCD detector pixel ① may be influenced by the ON pixel ②. And therefore, the decoding unit 220 proceeds to step S610 from step S606, thus performing image correction for the left of the CCD detector pixel at step S610.

Figure 8:
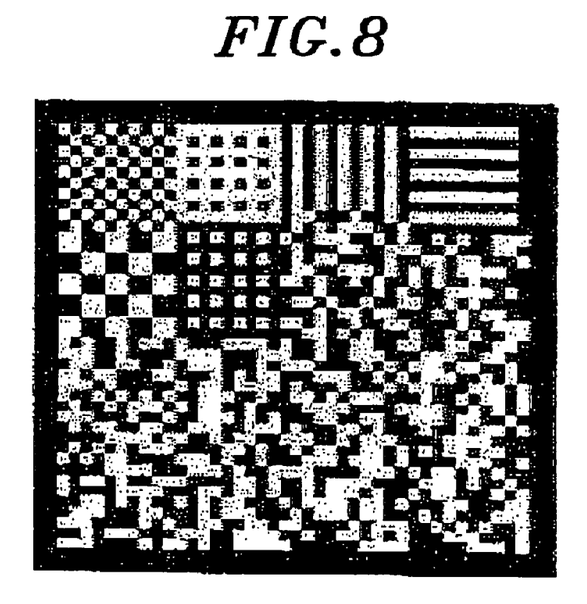
FIGS. 8 to 10 illustrate the pattern of original data recorded on a holographic storage medium and a restoration in a CCD in accordance with the preferred embodiment of the present invention.
Figure 9:
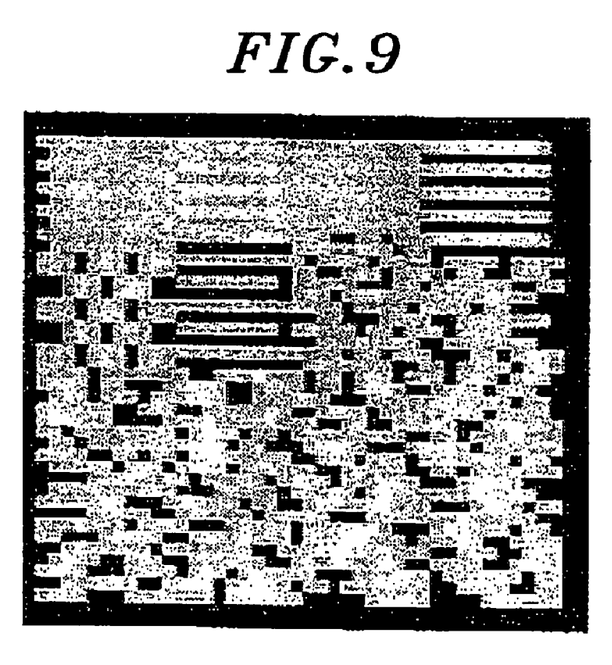
Figure 10:
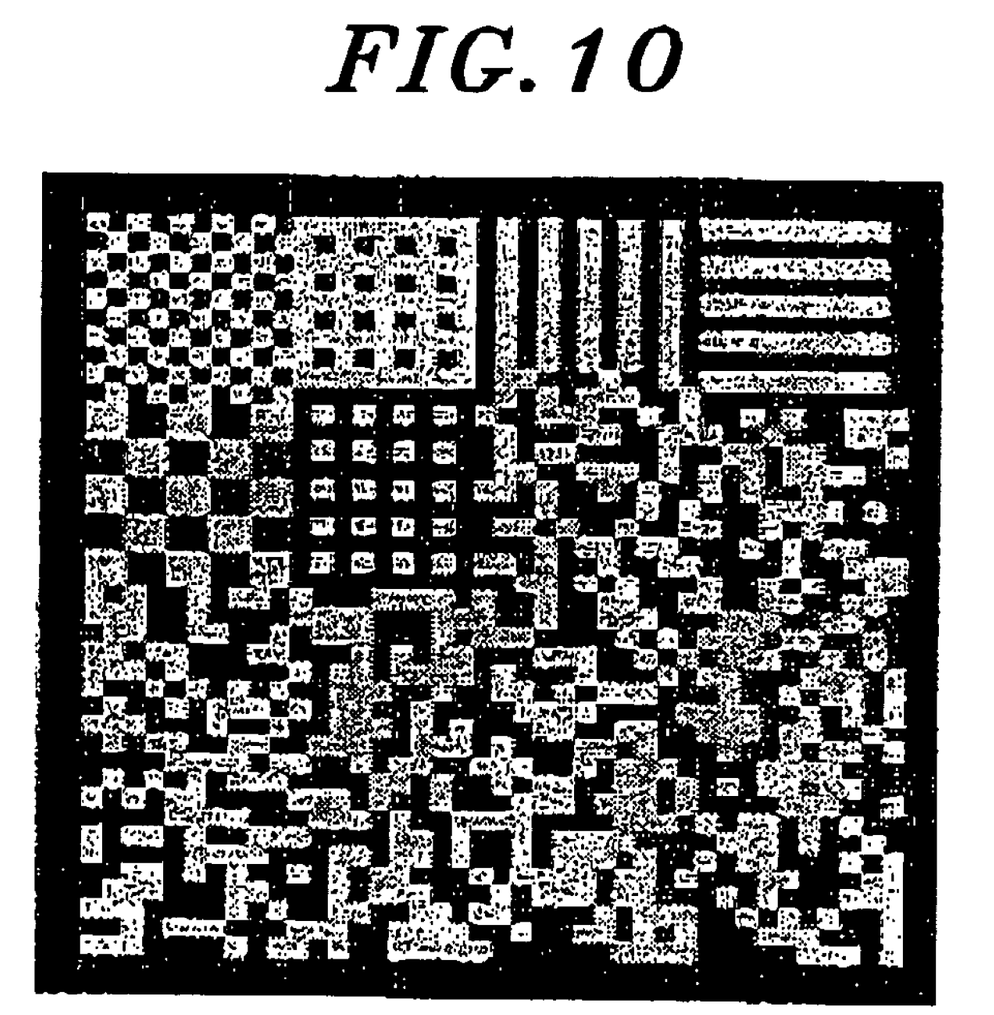

Therefore, if, for example, a misalignment of 0.5 pixel occurs when an image with a data pattern shown in FIG. 8 is reproduced, a problem of the conventional art, in which information on an ON pixel influences a CCD pixel to be detected as an OFF pixel due to the misalignment of pixels and an image with degraded data is generated as shown in FIG. 9, can be solved by applying the image correction processing flow of FIG. 6, thus restoring the pattern image of the original data without change, as shown in FIG. 10.

In the preferred embodiment, the case of one-dimensional misalignment is described, but an image can be restored even in case of, for example, a two-dimensional misalignment by applying the same correction method in horizontal and vertical directions.

As described above, in an image correction method for compensating for misalignment of CCD pixels when detecting a page-based information image, recorded on a holographic storage medium, using a CCD through one-to-one pixel matching signal processing in an HDDS system, the present invention is advantageous in that it stores in advance interference influences of neighboring CCD detector pixels for amounts of misalignments δ between data pixels and CCD detector pixels in a form of a lookup table, and corrects image data of a corresponding CCD detector pixel using the influences of the interference of neighboring pixels in the lookup table corresponding to the amount of misalignment between a corresponding data pixel and a corresponding CCD detector pixel at the time of reproduction, thus reducing a signal processing time required for image compensation due to a misalignment, and performing more reliable data decoding.

While the invention has been shown and described with respect to the preferred embodiment, it will be understood by those skilled in the art that various changes and modifications may be made without departing from the spirit and scope of the invention as defined in the following claims.

What is claimed is:

1. An image correction method for compensating for misalignment of pixels at the time of reproduction in a Holographic Digital Data Storage (HDDS) system, comprising the steps of:

a) detecting a stored page-based image using a Charge Coupled Device (CCD) through a one-to-one (1:1) pixel matching between data pixels and CCD detector pixels at the time of reproduction;

b) calculating, in case the misalignment of pixels occurs during the 1:1 pixel matching, an amount of the misalignment $\delta(0 \leq \delta < 1)$ between a corresponding data pixel and a corresponding CCD detector pixel;

c) calculating an interference influence of a neighboring pixel on the corresponding CCD detector pixel based on the calculated amount of the misalignment, and correcting image data of the CCD detector pixel; and d) compensating for a misalignment influence in accordance with the amount of the misalignment, and correcting the image data of the CCD detector pixel wherein the step c) includes the steps of:

c1) calculating an interference influence of a right neighboring pixel on the corresponding CCD detector pixel when the amount of the misalignment exceeds 0.5 pixel, and correcting the image data of the CCD detector pixel: and c2) calculating an interference influence of a left neighboring pixel on the corresponding CCD detector pixel when the amount of the misalignment is equal to or less than 0.5 pixel, and correcting the image data of the CCD detector pixel.

2. The image correction method of claim 1, wherein an corrected intensity $I^S(\delta)$ on the CCD detector pixel excluding the interference influence of the neighboring pixel is calculated by the following Equation:

$$I^S(\delta) = I(\delta) - \alpha[I^S_p(\delta) + I_{int}(\delta)],$$

wherein $\alpha$ is 0 if the neighboring pixel is OFF, while it is 1 if the neighboring pixel is ON; $I(\delta)$ is an intensity value detected at the CCD detector pixel; $I^S_p(\delta)$ is an intensity value added by the neighboring CCD detector pixel misaligned by $\delta$; and $I_{int}(\delta)$ is an intensity value of interference caused by the neighboring CCD detector pixel misaligned by $\delta$.

3. The image correction method of claim 1, wherein the interference influence of the neighboring pixel on the corresponding CCD detector pixel has been calculated in advance for amounts of misalignments between data pixels and CCD detector pixels and stored in a form of a lookup table.

4. The image correction method of claim 1, wherein the step d) is performed so that the misalignment influence $I_{diff}(0, \delta)$ in accordance with the amount of the misalignment is compensated by the following Equation:

$$I^S(0) = I^{S}(\delta) + I_{diff}(0,\delta),$$

wherein $I_{diff}(0, \delta) = I^S(0),$ wherein $I^S(0)$ is an corrected intensity value of the CCD detector pixel matched with the data pixel in case of assuming a misalignment does not occur; and $I^S(\delta)$ is an intensity value of the CCD detector pixel misaligned with the data pixel by $\delta$.

5. The image correction method of claim 4 wherein the misalignment influence has been calculated in advance for amounts of misalignments and stored in a form of a lookup table.

* * * * *